United States Patent [19]

Glinski

[11] 4,133,556
[45] Jan. 9, 1979

[54] SEAT BELT POSITIONING DEVICE

[75] Inventor: Paul A. Glinski, Sterling Heights, Mich.

[73] Assignee: General Motors Corporation, Detroit, Mich.

[21] Appl. No.: 816,334

[22] Filed: Jul. 18, 1977

[51] Int. Cl.² .......................................... B60R 21/10
[52] U.S. Cl. ................................... 280/744; 296/65 R
[58] Field of Search ............... 280/744; 297/385, 389; 296/65 R

[56] References Cited

U.S. PATENT DOCUMENTS

| 3,227,488 | 1/1966 | Kosbab et al. | 26/65 R X |
| 3,279,851 | 10/1966 | Hinchcliff | 297/385 |
| 3,295,862 | 1/1967 | Ebert | 280/744 |

FOREIGN PATENT DOCUMENTS 2147698  3/1973  Fed. Rep. of Germany ........ 296/65 R Primary Examiner—Robert R. Song
Assistant Examiner—Norman L. Stack, Jr.
Attorney, Agent, or Firm—Charles E. Leahy

[57] ABSTRACT

A seat bottom and a seat back are pivotally mounted for movement between a normal seating position and a cargo floor position. A seat belt includes a strap having one end anchored on the vehicle body, a buckle attached to the other end of the strap, and a plastic stiffening boot which extends through the gap between the seat back and the seat bottom to position the buckle element in an occupant accessible position. A spring urges the boot into engagement with the seat back to establish the boot and buckle in a normal position in which the seat bottom may be pivoted between the normal seating position and the pivoted position without interference with the boot or buckle. The spring yields when the seat back is pivoted forwardly to the cargo floor position and then returns the seat belt to the normal occupant accessible position when the seat back is returned to its normal seating position.

3 Claims, 4 Drawing Figures

SEAT BELT POSITIONING DEVICE

The invention relates to a seat belt positioning device and more particularly to a device for maintaining a seat belt buckle in an occupant accessible position in a seat which pivots to a cargo floor position.

Conventional seat belt systems for restraint of a seated occupant on a bench seat employ a short length of strap which extends through the gap between the seat bottom and the seat back position a buckle or a latch plate adjacent the hip of the seated occupant.

Conventional motor vehicles have a second seat comprised of a seat back and a seat bottom. In some such bench seat installations the seat bottom is pivoted at its forward end for bodily movement from its normal seating position through 90° of rotation to an upright position against the back of the front seat. The seat back is pivoted at its lower edge for forward pivoting movement through 90° of rotation to a generally horizontal cargo floor position.

The present invention provides a seat belt positioning device which maintains and restores the seat belt element in its normal occupant accessible position extending through the gap between the seat bottom and the seat back irrespective of pivotal movement of the seat bottom and seat back between their seating position and cargo floor position.

According to the invention, a seat bottom has its forward end pivoted to the vehicle body for pivotal movement between a normal seating position and a forward pivotal position. The seat back has its lower end pivoted to the vehicle body for pivotal movement between a normal seating position and a generally horizontal cargo floor position. A seat belt element includes a strap having one end anchored on the vehicle body and a buckle element attached to the other end. The seat belt element also has a plastic stiffening boot which maintains the buckle element at its full strap length from the end of the strap anchored on the vehicle body. A spring is enclosed by the plastic boot and acts between the boot and the belt anchor to position the buckle element in an occupant accessible position extending through the gap between the lower end of the seat back and the rearward end of the seat bottom. The spring urges the seat belt element into engagement with the seat back to establish the belt element in a normal position in which the seat bottom may be pivoted between the normal seating position and the forward pivotal position without interference with the belt element. The spring yields when the seat back is pivoted forwardly to the cargo floor position and then returns the seat belt element to the normal occupant accessible position when the seat back is returned to its normal seating position.

One feature, object and advantage of the invention is the provision of a seat belt positioning device for maintaining and restoring a seat belt element in an occupant accessible position extending through the gap between a seat bottom and a seat back which are pivotable between seating positions and cargo floor positions.

Another feature, object and advantage of the invention resides in the provision of a stiffening boot and a resilient spring cooperating to position a seat belt element through the gap between a seat bottom and a seat back and resiliently maintain the seat belt element in engagement with the seat back to restore and maintain the seat belt element in an occupant accessible position irrespective of pivoting movement of the seat back and seat bottom between their respective cargo floor positions and seating positions.

These and other features, objects and advantages of the invention will become apparent upon consideration of the appended specification and the drawings in which.

Figure 1:
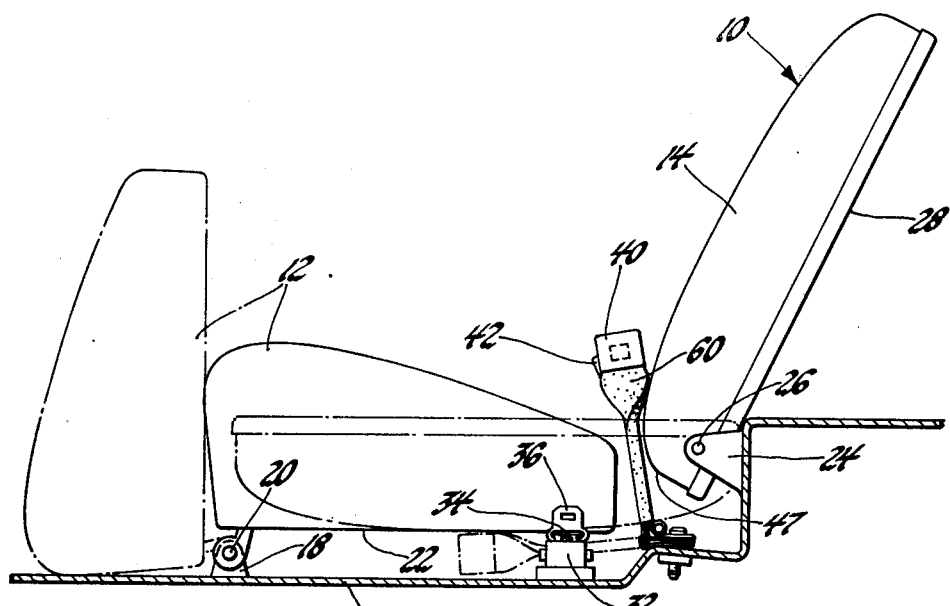
FIG. 1 is a side elevation view of a motor vehicle bench seat having a seat belt positioning device according to the invention.

Referring to FIG. 1, a vehicle body second seat is indicated generally at 10 and includes a seat bottom 12 and a seat back 14. The seat bottom 12 and seat back 14 are conventionally constructed and include a frame, a cushion and a seat covering to enclose the cushion.

The seat bottom 12 is connected to the floor pan 16 of the vehicle body by a support 18 and pivot pin 20 which support the seat bottom 12 for pivotal movement between the solid-line indicated normal seating position of FIG. 1 and the phantom-line indicated forward pivotal position against the back of a front seat. However, in some motor vehicle applications, the seat bottom 12 is folded forwardly through 180° of rotation to assume a horizontal cargo floor position in which case the underside 22 of the seat bottom 12 is preferably a rigid metal pan to form a cargo floor.

The seat back 14 is connected to the vehicle floor pan 16 by a support 24 and a pivot pin 26. Seat back 14 may be folded forwardly through 90° of rotation to the phantom-line indicated cargo floor position. The back surface 28 of the seat back 14 is a rigid metal pan to provide a cargo floor.

A seat belt system is associated with the seat 10 and includes a retractor 32 which is mounted on the floor pan 16 outboard the ends of the seat bottom 12 for winding a belt 34 having an attached latch plate 36. The belt system also includes a pair of seat belt buckles 40 and 42 which are connected to short lengths of strap 44 and 46 extending through a gap 47 between the seat bottom 12 and seat back 14. The strap 44 is anchored on the vehicle floor pan 16 by having its end extending through a slot in an anchor plate 48 having an aperture which receives an anchor bolt 50. The strap 46 and its associated buckle 42 are similarly connected to the floor pan 16 by an anchor plate 52 which overlies the anchor plate 48 and also has an aperture which receives the anchor bolt 50. A nut 54 is engaged on the bolt 50. The rearward ends of the anchor plates 48 and 52 have stamped indentations 56 and 58 by which they are interlocked to prevent relative rotation therebetween.

It will be understood that the latch plate 36 and its associated bolt 34 may be unwound from the retractor 32 for mating engagement in the buckle 40 to position the belt 34 across the lap of a seated occupant. Likewise it will be understood that the buckle 42 may be engaged by a latch plate and belt unwound from a reel, not shown, located at the opposite end of the vehicle seat. Accordingly a seat belt system is provided at each end of the vehicle seat, it being apparent that a third seat belt system may be provided between two outboard systems in those vehicles where the seat has adequate width for the seating of three occupants.

Referring again to FIG. 2, it is seen that the straps 44 and 46 are encased within a molded plastic stiffening boot or sleeve 60 which supports the buckles 40 and 42 at their full strap length from the anchor plates 48 and 52.

Figure 2:
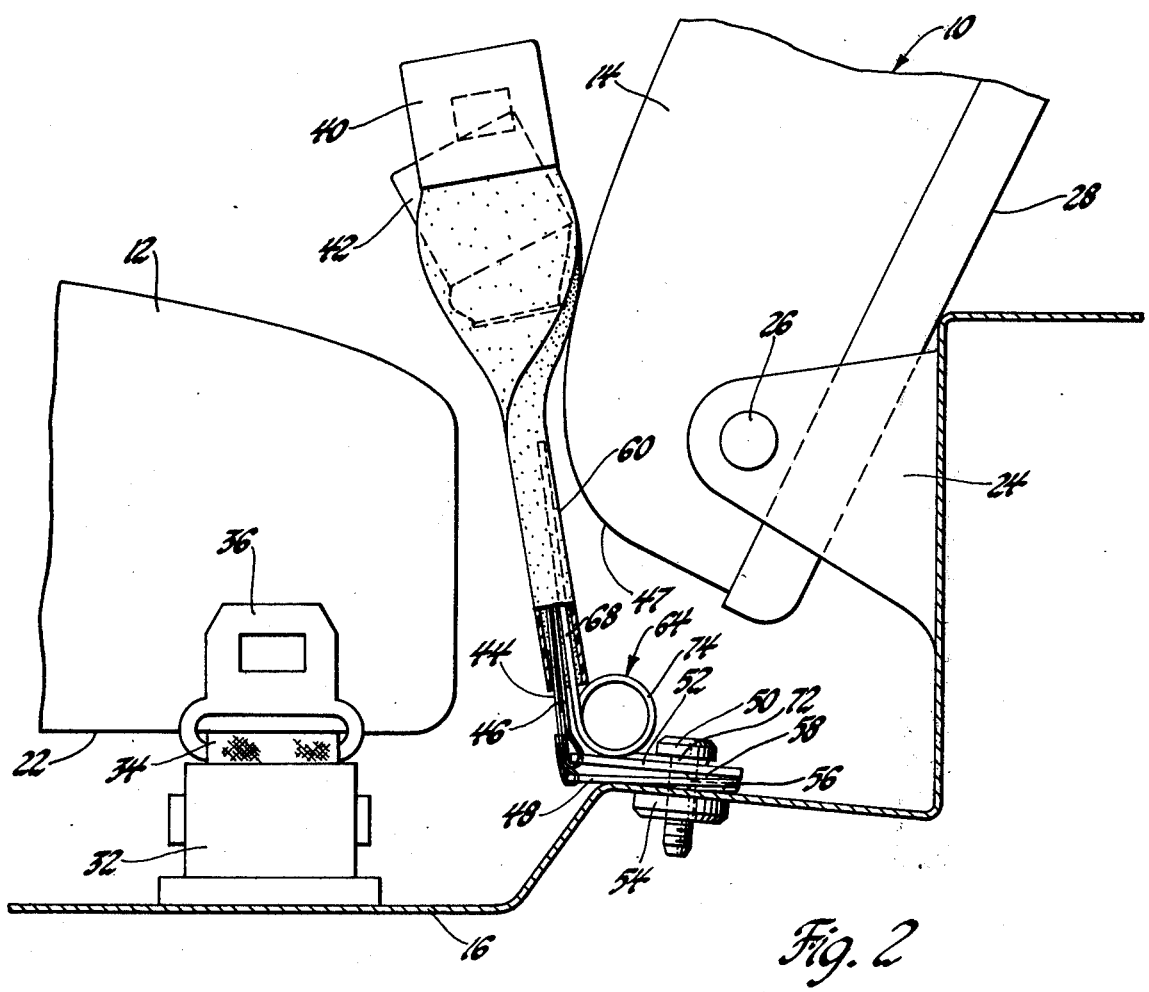
FIG. 2 is an enlarged fragmentary view similar to FIG. 1.
Figures 3, 4:
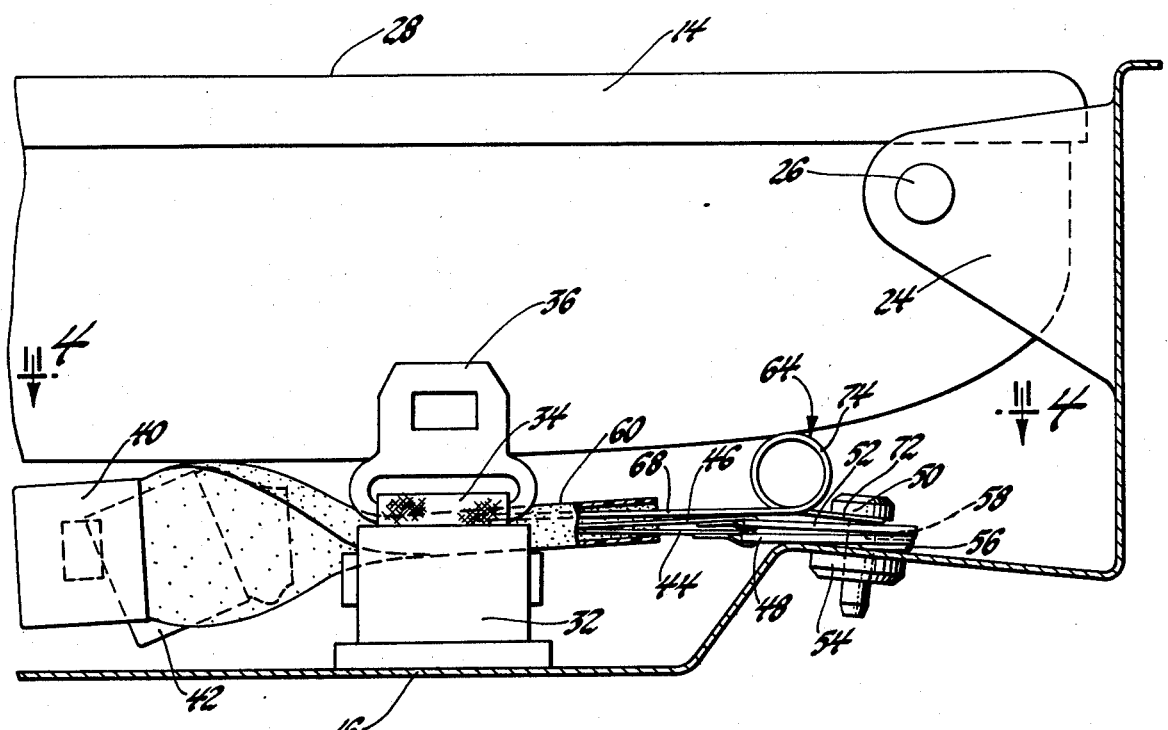
FIG. 3 is a view similar to FIG. 2 but showing the seat back pivoted forwardly to the cargo floor position.
FIG. 4 is a view taken in the direction of arrows 4—4 of FIG. 3.

Referring to FIGS. 2 and 4 it is seen that a spring 64 extends between the anchor bolt 50 and the stiffening boot 60 to urge the boot 60 and buckles 40 and 42 in the clockwise direction as viewed in FIG. 2. The spring 64 is formed of a resilient wire and includes a pair of laterally spaced legs 68 and 70 which are connected by an attachment portion 72 which encircles the bolt 50. Legs 68 and 70 have respective integral torsion coils 74 and 76 which seat on the anchor plate 52 and impart a torque on the legs 68 and 70 to urge the boot 60 into engagement with the seat back 14 as best seen in FIG. 2. The terminal ends of the spaced apart legs 68 and 70 are reversely bent at 78 and 80 and cooperate with the laterally spaced legs 68 and 70 to stabilize the boot 60 against twisting. As seen in FIGS. 2 and 4, the boot 60 and the straps 44 and 46 encased therein turn 90° intermediate their ends so that the lower end of the boot 60 is oriented transversely of the car to facilitate its passage through the gap between the seat back and seat bottom while the upper end of the boot 60 is oriented generally longitudinally of the car to align the buckles 40 and 42 for ease of engagement by their associated latch plates.

In operation, it will be appreciated from FIG. 1 that the stiffening boot 60 and the spring 64 cooperate to position the buckles 40 and 42 at their full strap length from the anchor plates 48 and 52 and to urge the boot 60 against the seat back 14. Accordingly, the buckles 40 and 42 are maintained in an occupant accessible position facilitating engagement by their respective latch plates.

Referring now to FIG. 1, it is seen that the seat bottom 12 is forwardly pivotably to a phantom-line indicated vertical position against the back of the front seat. During such forward pivotal movement of the seat bottom 12, the buckles 40 and 42 are held against the seat back 14 by the spring 64 and boot 60. Subsequent to movement of the seat bottom 12 to its forward pivotal position, the seat back 14 may be pivoted forwardly to its cargo floor position as best seen in FIG. 3. During such pivotal movement of the seat back 14 the torsion coils 74 and 76 of the spring 64 yield to permit the boot 60 and the buckles 40 and 42 to pivot forwardly from a generally vertical position to a generally horizontal position overlying the floor pan 16.

When the cargo carrying activity is completed, the seat back 14 may be returned to its upright condition whereupon the spring 64 causes the boot 60 and buckles 40 and 42 to follow the seat back 14 and thereby reestablish the buckles 40 and 42 in their occupant accessible position. The spring 64 maintains the boot 60 and buckles 40 and 42 against the seat back 14 so that the seat back bottom 12 may be returned to its seat forming position without interference with the buckles 40 and 42.

It will be understood that the seat belt positioning device of this invention may be used to position any suitable buckle, latch plate or like belt securing device.

Thus it is seen that the invention provides a seat belt positioning device including a stiffening boot and resilient spring which are cooperable to position a seat belt strap through the gap between a seat bottom and seat back and resiliently maintain the belt element in engagement with the seat back to restore and maintain the strap element in an occupant accessible position irrespective of pivotal movement of the seat back and seat bottom their between their respective cargo floor positions and seating positions.

The embodiments of the invention in which an exclusive property or privilege is claimed are defined as follows:

1. In a motor vehicle body, the combination comprising:
   a seat bottom pivoted to the vehicle body for pivotal movement between a normal seating position and a forward pivotal position;
   a seat back pivoted to the vehicle body for pivotal movement between a normal seating position and a generally horizontal cargo floor forming position;
   a seat belt element including a strap having one end anchored on the vehicle body and a belt securing device attached to the other end;
   said seat belt element having a stiffening means to maintain the belt securing device at a set strap length from the one end anchored on the vehicle body;
   spring means acting between the vehicle body and the seat belt element;
   said stiffening means and spring means cooperating to position the belt securing device in an occupant accessible position extending between the lower end of the seat back and the rearward end of the seat bottom, said spring means urging the seat belt element into engagement with the seat back to establish the seat belt element in a normal position in which the seat bottom may be pivoted between seating position and forward position without interference with the seat belt element, said spring means yielding under egagement of the seat belt element of the seat back when the seat back is tilted forwardly to the cargo floor forming position and maintaining the seat belt element in engagement with the seat back to return the seat belt element to the normal occupant accessible position when the seat back is returned to its normal seatng position.

2. In a motor vehicle body, the combination comprising:
   a seat bottom having its forward end pivoted to the vehicle body for pivotal movement between a normal seating position and a forward pivotal position;
   a seat back pivoted to the vehicle body for pivotal movement between a normal seating position and a generally horizontal cargo floor forming position;
   a seat belt element including a strap having one end anchored on the vehicle body and a belt securing device attached to the other end;
   a plastic stiffening boot enclosing the strap of the seat belt element to maintain the belt securing device at a set strap length from the one end anchored on the vehicle body;
   a spring of resilient wire having one end anchored on the vehicle body and the other end acting on the seat belt element and cooperating with the plastic boot to position the belt securing device in an occupant accessible position extending between the seat back and seat bottom and resiliently holding the seat belt element in engagement with the seat back and yielding under engagement of the seat belt element of the seat back when the seat back is tilted forwardly to the cargo floor position and maintaining the seat belt element in engagement with the seat back to return the seat belt element to the normal occupant accessible position when the seat back is returned to its normal seating position.

3. In a motor vehicle body, the combination comprising:
- a seat bottom having its forward end pivoted to the vehicle body for pivotal movement between a normal seating position and a forward pivotal position;
- a seat back having its lower end pivoted to the vehicle body for pivotal movement between a normal seating position and a generally horizontal cargo floor forming position;
- a seat belt element including a strap having a belt securing device attached to one end thereof;
- an anchor means attaching the other end of the strap on the vehicle body;
- a plastic stiffening boot enclosing the strap to maintain the belt securing device at a set strap length from the anchor means;
- and spring means acting between the anchor bolt and the plastic boot, said spring means having laterally spaced legs to stabilize the boot against twisting, an attachment portion engaging the anchor means, and a torsion coil intermediate the attachment portion and each of the laterally spaced legs to urge the plastic boot into engagement with the seat back to establish the seat belt element in a normal position in which the seat bottom may be pivoted between the seating position and forward position without interference with the seat belt element, said torsion coils yielding under engagement of the seat back aganist the 1 plastic boot when the seat back is tilted forwardly to a cargo floor forming position and maintaining the plastic boot in engagement with the seat back to return the seat belt element to the normal occupant accessible position when the seat back is returned to its normal seating position.

* * * * *